United States Patent
Patterson et al.

(10) Patent No.: US 7,027,612 B2
(45) Date of Patent: Apr. 11, 2006

(54) MARKING PHYSICAL OBJECTS AND RELATED SYSTEMS AND METHODS

(75) Inventors: Philip R. Patterson, Sherwood, OR (US); Neil E. Lofgren, White Salmon, WA (US); Tyler J. McKinley, West Linn, OR (US)

(73) Assignee: Digimarc Corporation

(*) Notice: Subject to any disclaimer, the term of this patent is extended or adjusted under 35 U.S.C. 154(b) by 571 days.

(21) Appl. No.: 10/242,300

(22) Filed: Sep. 11, 2002

(65) Prior Publication Data

US 2003/0118210 A1   Jun. 26, 2003

Related U.S. Application Data

(60) Provisional application No. 60/327,687, filed on Oct. 5, 2001.

(51) Int. Cl.
   *G06K 9/00* (2006.01)
(52) U.S. Cl. ..................................... 382/100
(58) Field of Classification Search ............... None
   See application file for complete search history.

(56) References Cited

U.S. PATENT DOCUMENTS

| | | | |
|---|---|---|---|
| 5,351,302 A | 9/1994 | Leighton et al. | |
| 5,805,286 A | 9/1998 | Voegler | |
| 5,862,260 A | 1/1999 | Rhoads | |
| 6,107,940 A | 8/2000 | Grimm | |
| 6,122,403 A | 9/2000 | Rhoads | |
| 6,223,125 B1 * | 4/2001 | Hall | 701/301 |
| 6,389,339 B1 * | 5/2002 | Just | 701/33 |
| 6,448,889 B1 | 9/2002 | Hudson | |
| 6,614,914 B1 | 9/2003 | Rhoads et al. | |
| 6,718,046 B1 | 4/2004 | Reed et al. | |
| 6,815,637 B1 | 11/2004 | Bell et al. | |
| 6,882,738 B1 | 4/2005 | Davis et al. | |
| 6,908,066 B1 | 6/2005 | Koenig | |
| 6,928,363 B1 | 8/2005 | Sankrithi | |
| 6,947,571 B1 | 9/2005 | Rhoads et al. | |
| 2003/0053654 A1 | 3/2003 | Patterson et al. | |
| 2004/0032972 A1 | 2/2004 | Stach et al. | |
| 2004/0064415 A1 | 4/2004 | Abdallah et al. | |

OTHER PUBLICATIONS

Effective Vehicle Protection by G R Tame, http://www.dex.co.za/news/news_vehicle.htm, Nov. 2002.*

Brownell, "Counterfeiters Dye Over Security Measures," SPIE's Sep. 2001 OE Magazine, pp. 8-9.

* cited by examiner

Primary Examiner—Jingge Wu
Assistant Examiner—Ashutosh Upreti
(74) Attorney, Agent, or Firm—Digimarc Corporation

(57) ABSTRACT

The present invention provides techniques whereby objects are readily identified. These inventive techniques are ideally suited for traffic monitoring. In one implementation a vehicle is marked with a machine-readable code on an outer, top surface of the vehicle. An elevated or aerial platform captures an image of the vehicle. A detector analyzes the captured image to recover the machine-readable code. The vehicle is identified from such. Traffic congestion can be determined by monitoring the movement of a marked vehicle through the city traffic. In some implementations the machine-readable code comprises an identifier, which is used to interrogate a database for related information.

29 Claims, 2 Drawing Sheets

MARKING PHYSICAL OBJECTS AND RELATED SYSTEMS AND METHODS

RELATED APPLICATION DATA

The present application claims the benefit of U.S. Provisional Application No. 60/327,687, filed Oct. 5, 2001. The present invention is also related to U.S. patent application Ser. No. 10/218,021 (published as U.S. 2003-0053654 A1), titled "Hiding Geo-Location Data Through Arrangement of Objects," filed Aug. 12, 2002 and U.S. patent application Ser. No. 09/571,422, filed May 15, 2000 (now U.S. Pat. No. 6,947,571). Each of the above-identified patent documents is herein incorporated by reference.

FIELD OF THE INVENTION

The present invention relates to steganography and data hiding.

BACKGROUND AND SUMMARY OF THE INVENTION

Acquisition of aerial imagery traces its history back to the Wright brothers, and is now commonly performed from satellite and space shuttle platforms, in addition to aircraft.

While the earliest aerial imagery relied on conventional film technology, a variety of electronic sensors are now more commonly used. Some collect image data corresponding to specific visible, UV or IR frequency spectra (e.g., the MultiSpectral Scanner and Thematic Mapper used by the Landsat satellites). Others use wide band sensors. Still others use radar or laser systems (sometimes stereo) to sense topological features in 3 dimensions. Other types of image collection rely on electro-optical panchromatic (grayscale), multi-spectral (less than 20 bands) and hyper-spectral (20 bands or more). Some satellites can even collect ribbon imagery (e.g., a raster-like, 1-dimensional terrestrial representation, which is pieced together with other such adjacent ribbons). Aerial imagery includes video as well as still imagery.

The quality of the imagery has also constantly improved. Some satellite systems are now capable of acquiring image and topological data having a resolution of less than a meter. Aircraft imagery, collected from lower altitudes, provides still greater resolution.

A huge quantity of aerial imagery is constantly being collected. Often the imagery includes miscellaneous objects such as cars or buildings. During image analysis each of these objects is—often manually—identified. Such processes are cumbersome and time consuming at best.

The present invention provides a mechanism for efficiently identifying physical objects depicted in aerial imagery. The physical objects are marked with machine-readable code prior to image capture. The machine-readable code persists in the imagery to aid identification of the marked object in the image. One application of these techniques is monitoring traffic from imagery captured by aerial platforms such as satellites, aircraft, elevated platforms, etc. Vehicles are marked on an outer surface with machine-readable code, which is preferably imperceptible to human observers but is detectable from optical scan data associated with the marked vehicle. The machine-readable code may include an identifier, which can uniquely identify the vehicle or link to associated information. In some implementations the machine-readable code includes a digital or steganographic watermark.

The foregoing and additional features and advantages of the present invention will be more readily apparent from the following detailed description with reference to the following figures.

BRIEF DESCRIPTION OF THE DRAWINGS

FIG. 1 illustrates the recognition of a watermarked vehicle from an aerial platform; while

DETAILED DESCRIPTION

For expository convenience, the following section focuses on satellite and other aerial "imagery" to illustrate the principles of the invention. The principles of the invention, however, are equally applicable to other forms of captured aerial data and to topographic/mapping information. Accordingly, the term "image" should be used to encompass all such other data sets, and the term "pixel" should be construed to encompass component data from such other data sets. The term "imagery" can also be used to represent video.

Digital watermarking now is discussed by way of background. Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of objects, including documents (e.g., through line, word or character shifting), software, multi-dimensional graphics models, and the surface of physical objects.

Digital watermarking systems typically include two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending U.S. patent application Ser. No. 09/503,881 (now U.S. Pat. No. 6,614,914) and U.S. patent application Ser. No. 6,122,403, which are each herein incorporated by reference.).

Figure 1:
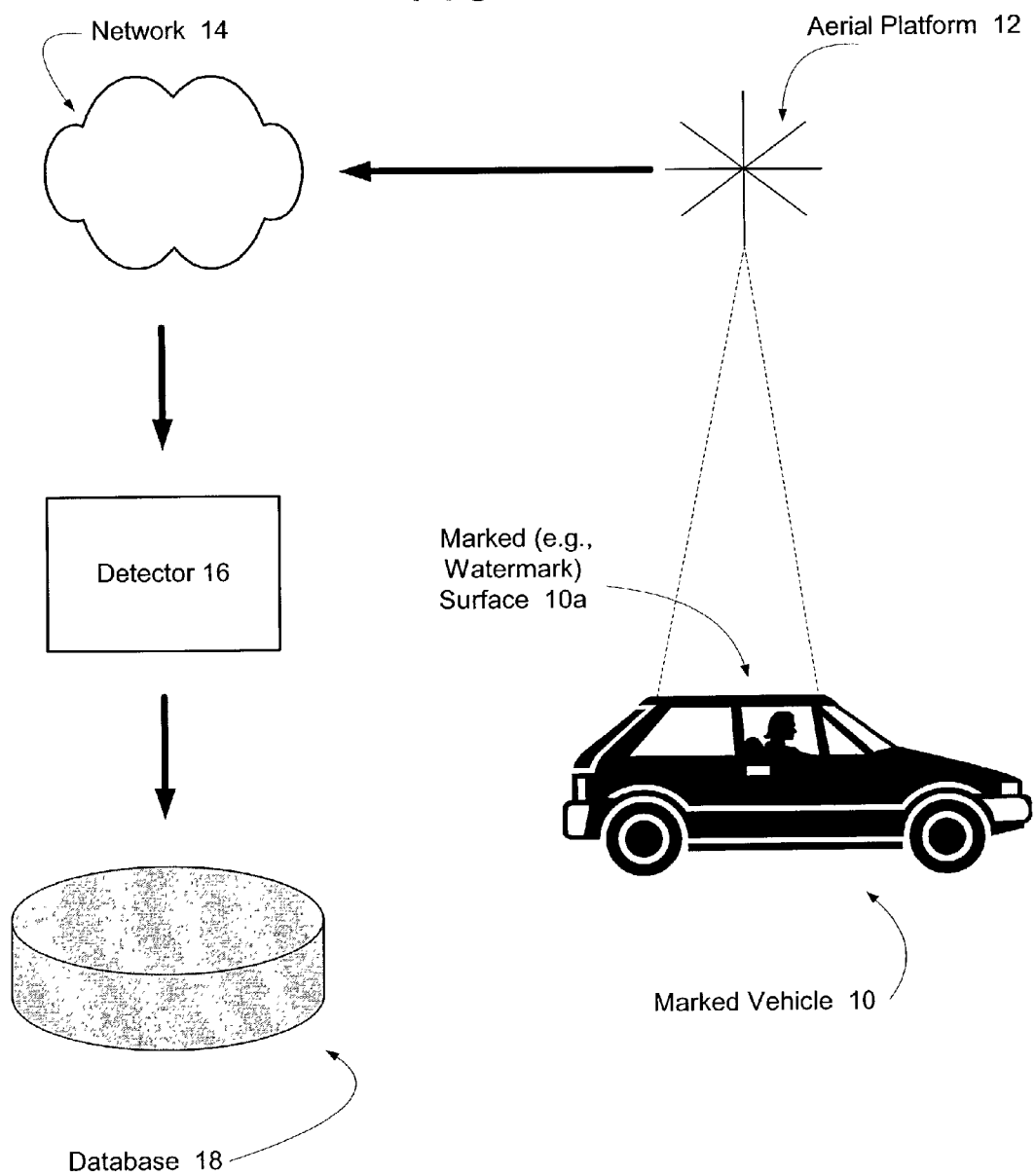

One aspect of the present invention considers traffic and vehicle monitoring. With reference to FIG. 1, a vehicle 10 (e.g., a car, train, RV, trailer, bus, truck, ship, airplane, etc., etc.) is marked with machine-readable code, such as a digital watermark. The marking can be accomplished according to a variety of different techniques. For example, digital watermarking can occur at a car manufacturing plant or auto body shop, in which an outer surface 10a (e.g., hood, roof, windshield, and/or trunk) of the vehicle 10 is embedded with a digital watermark during a painting process. Since many auto-painting processes include automated multi-jet sprayers—analogous to common desk jet-printers—paint droplet positions (or paint intensity, gain, amount, colors, etc.) can be subtlety varied to embed a digital watermark. Another marking process involves applying a transparent laminate layer over a painted surface or rear or front window. The laminate may include an adhesive to help adhere the laminate to the vehicle surface. The laminate layer preferably includes a steganographic pattern that is recognizable to detecting software, but is generally imperceptible to human observation. The marking (even if included via a laminate layer steganographic pattern) can optionally include IR or UV paints, dyes, or elements that emit in the IR and UV spectrums, respectively. In some implementations a steganographic pattern is laid down with IR or UV black painting coat. The vehicle then receives its normal painting. The IR or UV paint is detectable through the regular paint. The IR or UV emission can be analyzed to detect the digital watermark. Alternatively, a sticker or sign is applied to a vehicle. The sticker includes a digital watermark embedded therein. Still further, the surface topology of the vehicle's outer surface 10a can be varied according to a pattern. The pattern can have a predetermined frequency response that is identifiable by the detector.

Instead of applying a watermark at the manufacturing plant or auto body shop, a vehicle is alternatively marked on the street or in the field. Consider a paintball-like capsule that includes specialized inks or dyes. For example, inks and dyes have recently emerged with unique fluorescent properties. Some of these properties allow for variable fluorescence (or emission) decay times. Typical decay times can be varied from less than a microsecond to tens of milliseconds and more. These inks and dyes (both hereafter referred to as "ink") also include unique emission characteristics, such as emitting in a particular frequency band. Emitting in a particular frequency band allows for frequency-based detection. Other unique characteristics include varying the frequency of light needed to activate the ink and the color of the ink's fluorescence. These characteristics can be variously combined to produce customized ink. These types of ink are typically excited with UV light and emit from ultraviolet (UV) to infrared (IR) wavelengths. These inks are generally invisible when illuminated in the visible spectrum. Such inks are available from PhotoSecure in Boston, Mass., USA, such as those sold under the trade name of SmartDYE™. See SPIE's September 2001 OE Magazine, pages 8–9, written by M. Brownell ("Counterfeiters Dye Over Security Measures"), herein incorporated by reference, for a further discussion of such inks.

The ink capsule is thrown on or otherwise applied to the vehicle 10. The vehicle 10 is illuminated with UV (or IR) light, and the ink emits in a certain frequency band, or its emissions decay within an expected time frame. (Notice that normal lighting conditions typically include UV components, which may suffice to excite the UV (or IR) inks.). Monitoring can be accomplished by analyzing such emissions in the appropriate frequency.

An alternative field-marking technique requires the application of a transparent (or color matched) "sticker." The sticker preferably includes machine-readable code such as a digital watermark. The machine-readable code is detected with the above-described techniques.

In still another implementation, a laser or other etching tool is used to etch a digital watermark into a vehicle's surface. The laser or etching tool is preferably programmed to etch a predetermined pattern into the painted surface of the vehicle. Once securely positioned on the vehicle's surface 10a, the etching tool etches the pattern. The pattern conveys a message.

In yet another implementation, the marking is visually perceptible to a human observer—like a 1 or 2-D barcode. In other cases the visually perceptible marking is an alphanumeric number (e.g., like the number 13 on a taxi or police squad car). Optical character recognition software can be used to recognize and decipher the alphanumeric number. The marking may also include a pure or raw digital watermark signal—which remains visually perceptible once applied. The marking can be carried by a sticker or sign that is applied to the vehicle or can be directly applied to an outer vehicle surface.

Returning to FIG. 1, and regardless of the marking technique used to apply the machine-readable code to the marked surface 10a of the marked vehicle 10, the marked vehicle 10 is monitored from an aerial platform 12 such as a satellite, aircraft, or other aerial platform, or even by an elevated land-based camera. The aerial platform 12 captures an image including the marked surface 10a of the marked vehicle 10. The image is communicated, e.g., through a network 14, to a ground station or to an image analyst station (not shown). The ground or image analyst station includes a detector 16. The detector 16 searches the captured image to detect and decode the machine-readable code. If the machine-readable code includes a digital watermark, the detector 16 preferably includes a watermark detector to sniff (e.g., analyze) the captured image to detect and decode the watermark.

In our most preferred implementations the machine-readable code includes an identifier. The identifier is used to uniquely identify the vehicle 10. The identifier is registered in database 18, along with other information associated with the vehicle such vehicle make and model, vehicle ownership, history of vehicle movement, etc. (In the case of a watermark conveyed with fluorescing ink, the identifier may include a particular emission frequency band or decay time.). If vehicle 10 appears in a random image, vehicle 10 can be suitably identified from the watermark identifier, e.g., by querying the database 18. In other implementations, the identifier includes enough information to suitable identify the vehicle without database consultation.

The identifier may also serve as a link. Once decoded from a captured image, the identifier is used to interrogate the database 18 or link to another data repository to retrieve related information. For more information on watermark-based linking see the above-mentioned U.S. patent application Ser. No. 09/571,422, filed May 15, 2000 (now U.S. Pat. No. 6,947,571), which is herein incorporated by reference.

Our inventive techniques can be used to monitor vehicle congestion in heavy city traffic, monitor the movements of a vehicle, and even determine whether a train, plane or bus is running on schedule. Consider FIG. 2. A vehicle 10 is marked with machine-readable code. The marking is typically placed on an outer surface of the vehicle (e.g., hood, trunk, topside, windshield, etc.). In preferred implementations the code is imperceptible to human observers. In other implementations, the code is perceptible—like a large sign or perceptible marking placed on the outer top surface of the vehicle. An aerial platform 12 captures an image of the marked vehicle 10. In most cases the aerial platform 12 communicates the captured image to a ground station for analysis, perhaps via a network 14. The ground station employs a detector 16 to sniff out any machine-readable code. The detector 16 extracts an identifier from detected machine-readable code. In some cases the identifier will include enough information to uniquely identify the vehicle. In other cases the detector 16 (or a computer system working in conjunction with the detector 16) communicates the identifier to a database 18. The identifier is used to interrogate the database 18 to locate information that is associated with the identifier. Examples of such information include vehicle owner, vehicle movement history, travel patterns, vehicle last known location, etc., etc.

Figure 2:
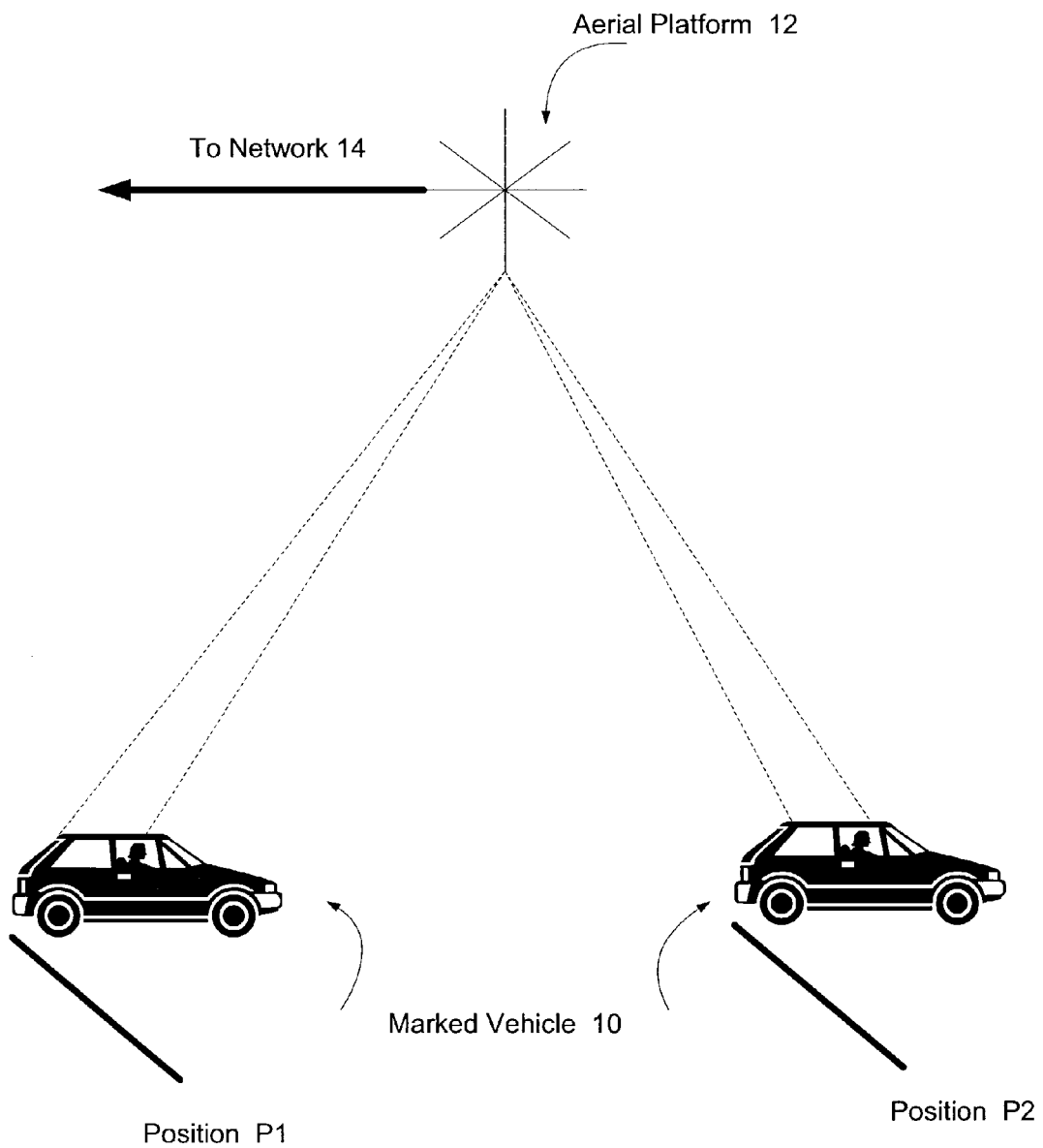
FIG. 2 illustrates a traffic-monitoring example.

Returning to the traffic monitoring example illustrated in FIG. 2, the vehicle's 10 movement between a predetermine distance, like between position P1 to position P2, is monitored to determine the extent of traffic congestion, best possible routes through downtown traffic, speed traveled by the vehicle, etc. The machine-readable markings facilitate—and even allow for automated processing of—the monitoring.

We envision many other applications of our techniques. Consider a radio station that is sponsoring a contest. Contestants mark their cars and aerial surveillance—perhaps a traffic helicopter—searches for any such markings. Once a marked car is found, an identifier is recovered from the machine-readable code. An owner is identified and the station announces that the car has just been spotted. This process can be automated. An alert engine can be set to monitor imagery for certain identifiers. Once a predetermined identifier is found, the alert is sent out.

In another scenario, the hidden markings allow for covert observation and identification of a vehicle—perhaps by a jealous lover or suspecting spouse. Moreover, marking a vehicle will allow for the vehicle to be identified—regardless of whether the vehicle is expected to be in a captured image or not.

In still another scenario, a vehicle (e.g., bus, ship, train or plane) is marked and an aerial platform determines whether the vehicle is running on schedule based on the location of the vehicle.

All of these examples permit an identifier recovered from a marked vehicle to be linked to additional information stored in a data structure.

In yet another scenario, semi-mobile objects, such as beehives, trailers, tarps and tents, are marked with machine-readable code on an outer surface. The machine-readable code includes an identifier that is linked to information stored in a data repository. An aerial platform captures an image of the marked outer surface. The identifier is recovered to identify the vehicle, perhaps by linking to the data repository. Movement of semi-mobile objects can be tracked via aerial imagery.

CONCLUSION

The foregoing are just exemplary implementations of the present invention. It will be recognized that there are a great number of variations on these basic themes. The foregoing illustrates but a few applications of the detailed technology. There are many others. For example, while we have described the FIG. 1 embodiment as including a detector-based ground or image analyst station, the present invention is not so limited. Indeed the aerial platform 12 or other location may include the detector 16. Similarly, the present invention need not communicate through a network, but may rather communicate directly with a ground station, etc. Still further, the ground station (or aerial platform, if it includes a detector) may communicate a decoded identifier to an analyst station or other computer, which such station then communicates with database 18 or with a related data repository.

There are many advantages to the present invention. The machine-readable code is preferably imperceptible to human observers. Consider a jealous lover who hires a private investigator to monitor the movements of her lover. The private investigator places a steganographic marking on the vehicle, and since there are no "electronic" signals given off from the steganographic marking, a standard "bug" sweep will not find the code like it would for an radio-frequency (RF) based device. A visual inspection is similarly thwarted.

To provide a comprehensive disclosure without unduly lengthening this specification, applicants incorporate by reference, in their entireties, the disclosures of the above-cited patents and applications. The particular combinations of elements and features in the above-detailed embodiments are exemplary only; the interchanging and substitution of these teachings with other teachings in this application and the incorporated-by-reference patents/applications are also contemplated.

Although not belabored, artisans will understand that the systems described above can be implemented using a variety of hardware and software systems. One implementation employs a computer or server with a large disk library, and capable database software (such as is available from Microsoft, Oracle, etc.). Identifier registration, message detection, and other operations are performed in accordance with software instructions stored in the disk library or on other storage media, and executed by a processor in the computer as needed. (Alternatively, dedicated hardware, or programmable logic circuits, can be employed for such operations.).

In view of the wide variety of embodiments to which the principles and features discussed above can be applied, it should be apparent that the detailed embodiments are illustrative only and should not be taken as limiting the scope of the invention.

What is claimed is:

1. A method to uniquely identify a mobile object depicted in an image, wherein the image is captured from an elevated or aerial platform, said method comprising:
   analyzing the image to detect machine-readable code associated with the depicted mobile object, wherein the mobile object is steganographically marked with the machine-readable code prior to image capture, and wherein the machine-readable code comprises an identifier;
   decoding the machine-readable code to obtain the identifier; and
   identifying the mobile object via the identifier.

2. The method of claim 1 wherein the machine-readable code comprises a digital watermark.

3. The method of claim 1 wherein the mobile-object is only semi-mobile, and the object comprises at least one of a beehive, tent and trailer.

4. The method of claim 1 further comprising linking to a data repository with at least the identifier.

5. The method of claim 4 wherein said identifying comprises accessing information stored in the data repository with the identifier to make an identification.

6. The method of claim 1 wherein the mobile object comprises a vehicle.

7. The method of claim 6 wherein the machine-readable code comprises an ink or paint having an predetermined fluorescing frequency band.

8. The method of claim 6 wherein the machine readable code comprises an ink or paint having an predetermined fluorescing decay time.

9. The method of claim 6 wherein the machine-readable code comprises steganographic markings.

10. A method of monitoring traffic comprising:
    marking a vehicle which will travel on a road with machine-readable code, wherein the machine-readable code is provided on a vehicle surface so as to be detectable from aerial imagery captured of the marked vehicle, but remains generally imperceptible to a human observer of the vehicle, and wherein the machine-readable code comprises a plural-bit identifier;

capturing an image of the marked vehicle;

decoding the machine-readable code from a captured image to recover the plural-bit identifier; and monitoring the vehicle based at least in part by the plural-bit identifier.

11. The method of claim 10, wherein once the vehicle has been identified, said method further comprises monitoring the vehicle's progress in traffic in relation to a predetermined position or for a predetermined time period.

12. The method of claim 10, wherein once the vehicle has been identified, said method further comprises monitoring the vehicle's speed with respect to a predetermined distance.

13. The method of claim 10, wherein said identifying comprises interrogating a data structure with the plural-bit identifier to access related information, wherein the related information is associated with the plural-bit identifier prior to image capture.

14. The method of claim 13 wherein the related information comprises at least one of vehicle movement history, vehicle ownership and a distance over which the vehicle will travel.

15. The method of claim 10, wherein the machine-readable code comprises a digital watermark.

16. The method of claim 10, wherein the marking is visually perceptible to a human observer of the marking.

17. The method of claim 10, wherein said marking is provided by subtly varying the surface texture of the vehicle surface to include the machine-readable code.

18. The method of claim 10 wherein said marking comprising at least a steganographic component which is visually imperceptible to a casual observer of the marking.

19. A method of identifying a vehicle comprising:

optically capturing an image of the vehicle from an aerial platform, wherein the vehicle includes a steganographically hidden marking that is hidden prior to image capture, and wherein the marking is hidden on a vehicle surface so as to be viewable from the aerial platform, and wherein the marking includes a plural-bit identifier;

analyzing the captured image to detect the steganographically hidden marking and to obtain the plural-bit identifier; and identifying the vehicle based on the plural-bit identifier.

20. The method of claim 19 further comprising interrogating a data structure with the plural-bit identifier to access information associated with the vehicle.

21. The method of claim 19 wherein the steganographically hidden marking comprises a digital watermark.

22. The method of claim 19 wherein the marking is hidden by applying an ultraviolet or infrared ink to the vehicle surface that is viewable from the aerial platform, and wherein the plural-bit identifier comprises an emission frequency band of the ink.

23. The method of claim 19 wherein the steganographic signal is redundantly embedded across the vehicle surface.

24. A mobile vehicle comprising an outer surface having a machine-readable code provided thereon, wherein the machine-readable code is generally imperceptible to human viewers of the vehicle, and wherein the machine-readable code is detectable from analysis of optical scan data, wherein the machine-readable code serves to uniquely identify the vehicle from aerial imagery including the vehicle.

25. The vehicle of claim 24 wherein the machine-readable code comprises a steganographic marking.

26. The vehicle of claim 24 wherein the machine-readable code is detectable from visible light scan data.

27. The vehicle of claim 24 wherein the machine-readable code comprises digital watermarking.

28. The vehicle of claim 24 wherein the machine-readable code is detectable from non-visible light scan data.

29. The vehicle of claim 24 wherein the code comprises plural-bits.

* * * * *